(12) United States Patent
Mahy et al.

(10) Patent No.: US 7,466,812 B1
(45) Date of Patent: Dec. 16, 2008

(54) CONNECTING AN ENDPOINT TO A CONFERENCE CALL

(75) Inventors: Rohan W. Mahy, Santa Cruz, CA (US); Cullen F. Jennings, Milpitas, CA (US)

(73) Assignee: Cisco Technology, Inc., San Jose, CA (US)

( * ) Notice: Subject to any disclaimer, the term of this patent is extended or adjusted under 35 U.S.C. 154(b) by 1150 days.

(21) Appl. No.: 10/691,369

(22) Filed: Oct. 22, 2003

(51) Int. Cl.
H04M 3/42 (2006.01)

(52) U.S. Cl. .......... 379/202.01; 370/260; 370/261; 709/204; 709/227

(58) Field of Classification Search .......... 379/202.01; 370/260, 261; 709/204, 227
See application file for complete search history.

(56) References Cited

U.S. PATENT DOCUMENTS

| | | | |
|---|---|---|---|
| 6,262,979 B1 | 7/2001 | Anderson et al. | 370/267 |
| 6,275,575 B1 * | 8/2001 | Wu | 379/202.01 |
| 6,427,008 B1 | 7/2002 | Balaz | 379/202.01 |
| 6,532,477 B1 | 3/2003 | Tang et al. | 707/104.1 |
| 6,744,741 B1 * | 6/2004 | Ju et al. | 370/260 |
| 7,308,090 B2 * | 12/2007 | White et al. | 379/202.01 |
| 2003/0035381 A1 * | 2/2003 | Chen et al. | 370/261 |

OTHER PUBLICATIONS

Rosenberg, J., "*A Framework for Conferencing with the Session Initiation Protocol*", I-D Action:draft-rosenberg-sipping-conferencing-framework-01.txt, Feb. 12, 2003, http://www1.ietf.org/mail-archive/ietf-announce/Current/msg22573.html, 2 total pages.
Rosenberg, J., "*A Framework for Conferencing with the Session Initiation Protocol*", Internet Engineering Task Force, draft-rosenberg-sipping-conferencing-framework-01.txt; Feb. 12, 2003, http://www.ietf.org/internet-drafts/draft-rosenberg-sipping-conferencing-framework-01.txt. 36 total pages.

* cited by examiner

*Primary Examiner*—Quynh H Nguyen
(74) *Attorney, Agent, or Firm*—Baker Botts L.L.P.

(57) ABSTRACT

Connecting an endpoint to a conference call includes associating a caller identifier with a conference call identifier, where the caller identifier corresponds to an endpoint and the conference call identifier corresponds to a conference call. A call is received from the endpoint, and the caller identifier is determined to be associated with the conference call identifier. Connection of the endpoint to the conference call is initiated.

26 Claims, 2 Drawing Sheets

CONNECTING AN ENDPOINT TO A CONFERENCE CALL

TECHNICAL FIELD OF THE INVENTION

This invention relates generally to the field of telecommunications and more specifically to connecting an endpoint to a conference call.

BACKGROUND OF THE INVENTION

A conference call may allow more than two endpoints to participate in a call. To participate in a call, a user of an endpoint may dial a telephone number to access a conference server. The user may be asked to provide a conference identifier and other identifies such as a user identifier. After entering the requested information, the user may be connected to the conference call. Entering the requested information may be cumbersome. Consequently, connecting an endpoint to a conference call may be unsatisfactory in certain situations.

SUMMARY OF THE INVENTION

In accordance with the present invention, disadvantages and problems associated with previous techniques for connecting an endpoint to a conference call may be reduced or eliminated.

According to one embodiment of the present invention, connecting an endpoint to a conference call includes associating a caller identifier with a conference call identifier, where the caller identifier corresponds to an endpoint and the conference call identifier corresponds to a conference call. A call is received from the endpoint, and the caller identifier is determined to be associated with the conference call identifier. Connection of the endpoint to the conference call is initiated.

Certain embodiments of the invention may provide one or more technical advantages. A technical advantage of one embodiment may be that a caller identifier associated with an endpoint may be efficiently associated with a conference call in which the endpoint was participating. Accordingly, the endpoint may be readily connected or reconnected to the conference call.

Another technical advantage of one embodiment may be that the endpoint is not required to send conference identifier information in order to connect to the call. Yet another technical advantage of one embodiment may be that the endpoint may be required to send authentication information before being connected to the conference call. And yet another technical advantage of one embodiment may be that the user of the endpoint may be given a choice to connect to the conference call.

Certain embodiments of the invention may include none, some, or all of the above technical advantages. One or more other technical advantages may be readily apparent to one skilled in the art from the figures, descriptions, and claims included herein.

BRIEF DESCRIPTION OF THE DRAWINGS

For a more complete understanding of the present invention and its features and advantages, reference is now made to the following description, taken in conjunction with the accompanying drawings, in which.

DETAILED DESCRIPTION OF THE DRAWINGS

Figure 1:
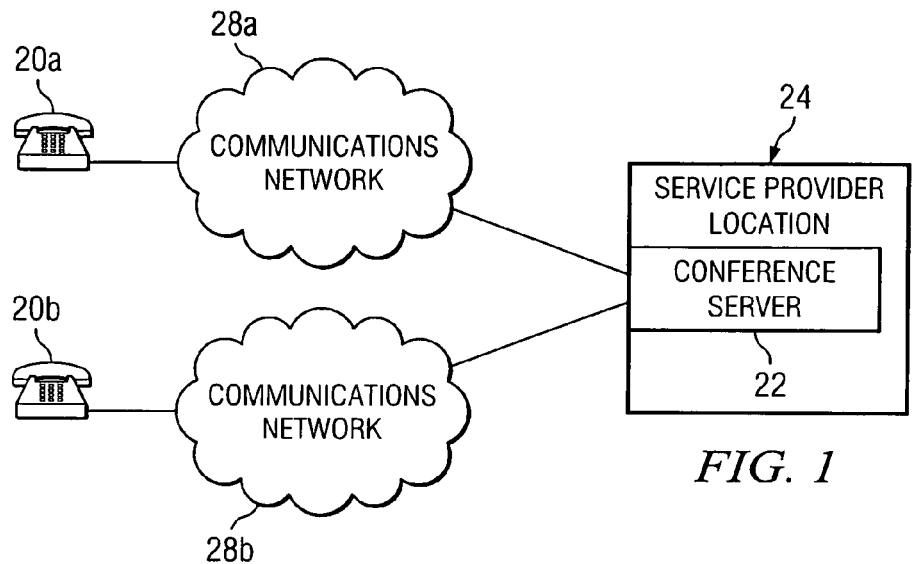
FIG. 1 is a block diagram of one embodiment of a system that includes a conference server that may connect an endpoint to a conference call.
Figure 2:
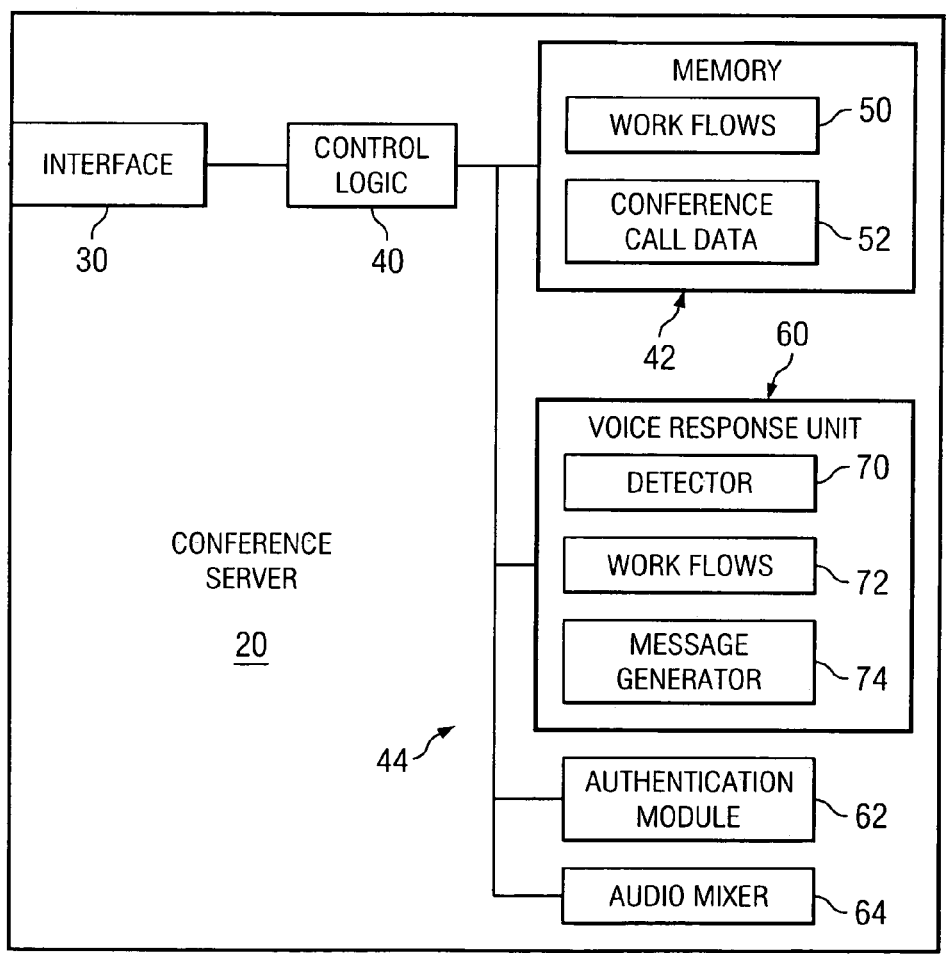
FIG. 2 is a block diagram of one embodiment of the conference server of the system of FIG. 1.
Figure 3:
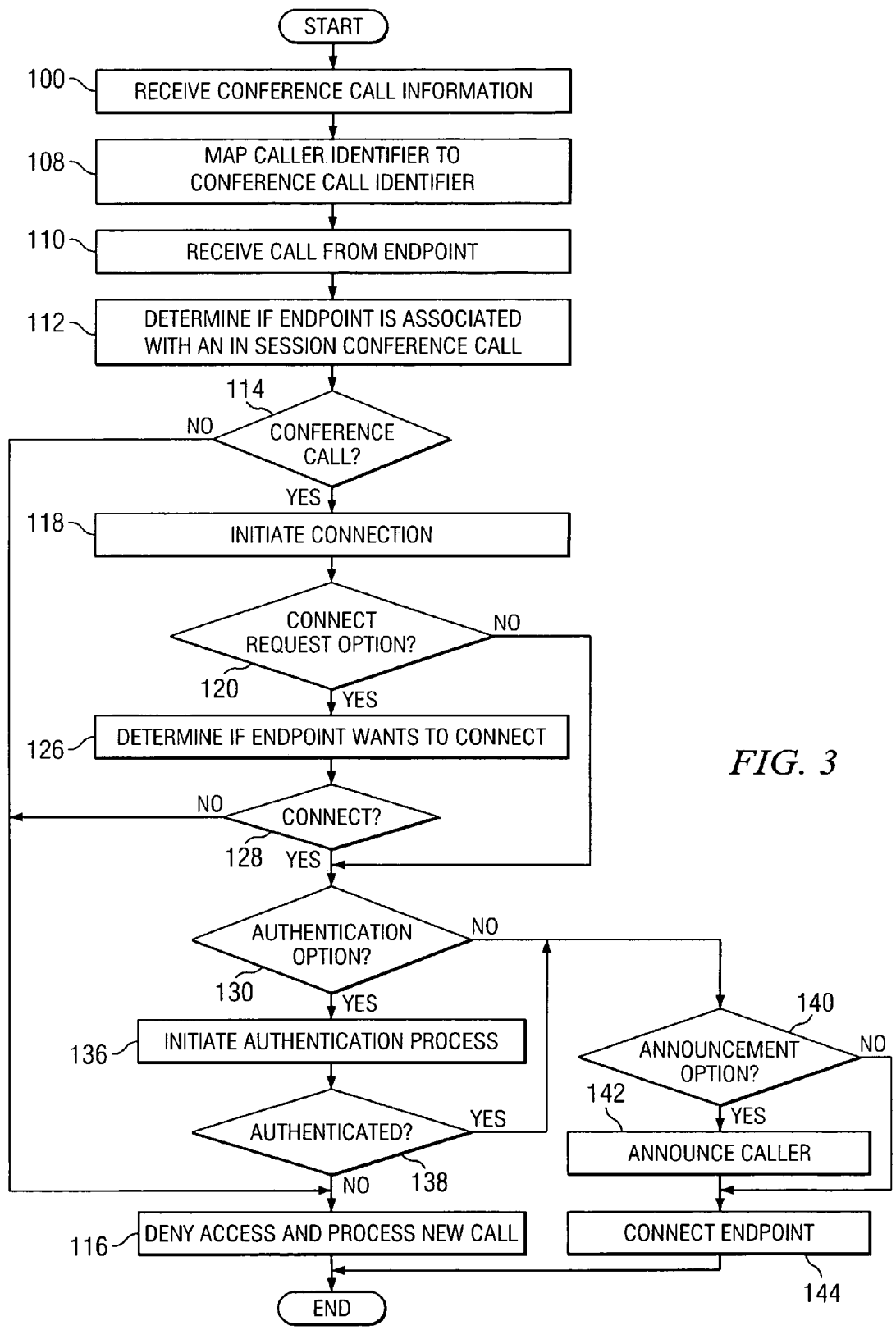
FIG. 3 is a flowchart demonstrating one embodiment of a method for connecting an endpoint to a conference call.

Embodiments of the present invention and its advantages are best understood by referring to FIGS. 1 through 3 of the drawings, like numerals being used for like and corresponding parts of the various drawings.

FIG. 1 is a block diagram of one embodiment of a system 10 that includes a conference server that may connect an endpoint to a conference call. According to the embodiment, the conference server provides a conference call service to endpoints. The conference server records caller identifiers for one or more of the endpoints that may participate in the conference call, and maps the caller identifiers to the conference call. To participate in a conference call, a user of an endpoint may dial a conference call phone number to access the conference server. The conference server may connect the endpoint to the conference call according to the caller identifier mapped to the conference call. Accordingly, the user of endpoint may readily join the conference call.

According to one embodiment, an endpoint may be readily reconnected to a conference call. For example, an endpoint may be disconnected if a cell phone drops a call or if a wired phone is unplugged or loses power. If an endpoint is disconnected from the conference call, the endpoint may contact the conference server. The conference server may reconnect the endpoint to the conference call according to the caller identifier mapped to the conference call. Accordingly, the user of the endpoint may just call the original number to rejoin the conference.

According to the illustrated embodiment, system 10 includes endpoints 20 coupled to a conference server 22 at a service provider location 24 through communications networks 28 as illustrated in FIG. 1. An endpoint 20 may comprise any device suitable to place a call and to participate in a conference call. Endpoint 20 may comprise, for example, a personal digital assistant, a telephone, a mobile handset, or any other device suitable for communicating signals to and from communication network 22.

Endpoint 20 may support, for example, signaling used in telephone networks, such as the public switched telephone network (PSTN), integrated services digital network (ISDN), ISDN user part (ISUP), channel associated signaling (CAS), robbed-bit signaling, R2 signaling, Q reference point signaling (QSIG), or cellular signaling; or signaling used in conjunction with Internet Protocol (IP) networks, such as the session initiation protocol (SIP), H.323, H.248, media gateway control protocol (MGCP), mobile IP, or other voice over IP (VoIP) protocols; or any other suitable communication protocol.

A call refers to a connection between two or more stations and to operations used to establish, maintain, and release the connection. A call may be in session when there is an active connection. During a call, endpoints 20 may communicate signals, such as signals comprising packets. A packet may comprise a bundle of data organized in a specific way for transmission. A packet may carry any suitable information such as voice, data, multimedia, other information, or any combination of the preceding.

Communication networks 28 allows endpoints 20 to communicate with conference server 22. A communication network 22 may comprise a public switched telephone network (PSTN), a public or private data network, the Internet, a wireline or wireless network, a local, regional, or global communication network, an enterprise intranet, other suitable communication link, or any combination of the preceding.

Service provider location 24 refers to a location of a service provider. A service provider may comprise any entity that provides a telecommunications service such as a telephone company or an enterprise network. According to the illustrated embodiment, service provider location 24 includes conference server 22. Conference server 22 may, however, be located at any suitable location.

Conference server 22 provides a conference call service to endpoints 20. According to one embodiment, conference server 22 records caller identifiers of endpoints 20 participating in a conference call. Conference server 22 associates the caller identifiers with the conference call by, for example, mapping caller identifiers to corresponding conference call identifiers. If an endpoint 20 is disconnected from the conference call, conference server 22 may readily connect endpoint 20 to the conference call using the caller identifiers mapped to the conference call identifier. Conference server 22 is described in more detail with reference to FIG. 2.

Modifications, additions, or omissions may be made to system 10 without departing from the scope of the invention. For example, conference server 22 may be located somewhere other than at service provider location 24. Moreover, the operations of system 10 may be performed by more, fewer, or other modules. For example, the operations of conference server 22 may be performed by more than one module. Additionally, functions may be performed using any suitable logic comprising software, hardware, other logic, or any suitable combination of the preceding. As used in this document, "each" refers to each member of a set or each member of a subset of a set.

FIG. 2 is a block diagram of one embodiment of conference server 22 of system 10 of FIG. 1. According to the illustrated embodiment, conference server 22 includes an interface 30, control logic 40, a memory 42, and one or more modules 44 coupled as shown in FIG. 2. Interface 30 establishes and maintains communication between endpoint 20 and conference server 22. Interface 30 may include a computer telephony application programming interface (CT API) such as the Java Telephony API (JTAPI) or Microsoft/Intel Telephony API (TAPI), a time division multiplex (TDM) hardware interface or other telephony hardware interface, a multimedia IP signaling interface such as a session initial protocol (SIP), H.248, H.323, or media gateway control protocol (MGCP) interface, or other suitable interface.

Control logic 40 manages the operation of modules 44 of conference server 22. As used in this document, the term "control logic" refers to any suitable device operable to accept input, process the input according to predefined rules, and produce output, for example, a personal computer, work station, network computer, wireless telephone, personal digital assistant, one or more microprocessors within these or other devices, or any other suitable processing device.

Memory 42 stores data used by conference server 22, and may include Random Access Memory (RAM), Read Only Memory (ROM), magnetic drives, disk drives, Compact Disk (CD) drives, Digital Video Disk (DVD) drives, removable media storage, network attached storage, any other suitable data storage device, or any combination of any of the preceding.

According to the illustrated embodiment, memory 22 includes workflows 50 and conference call data 52. Workflows 50 describe the operation of control logic 40. An example of a workflow 50 is described in more detail with reference to FIG. 3. Conference call data 52 may include a conference call table that associates caller identifiers of endpoints 20 participating in a conference call with a conference call identifier of the conference call. A caller identifier of an endpoint 20 may comprise a unique identifier associated with endpoint 20 that serves to distinguish endpoint 20 from other endpoints 20. A caller identifier may comprise, for example, a phone number, a name of a user, an electronic mail address, universal resource identifier (URI), or other identifier. A conference call identifier may comprise a unique identifier that distinguishes the conference call from other conference calls.

A caller identifier may be obtained in any suitable manner. For example, the caller identifier may be obtained from a PSTN service such as a calling line identity presentation (CLIP), a connected line presentation (COLP), a calling name identification presentation (CNIP), or a connected name presentation (CONP) service. As another example, the caller identifier may be obtained from name or number identification services provided by H.323 signaling. As another example, the caller identifier may be obtained from a name identification service from Q reference point signaling (QSIG). As yet another example, the caller identifier may be obtained from a contact, from, p-asserted-identity, p-preferred-identity, record-route, or via header, or an authenticated identity body (AIB) of a SIP message.

A caller identifier may be associated with a conference call identifier by mapping the caller identifier to the conference call identifier. The mapping between a caller identifier and a conference call identifier may be stored for a predetermined period of time after an endpoint disconnects to allow the endpoint to reconnect. The predetermined period of time may be of any suitable duration, for example, between three and ten minutes such as five minutes. When a conference call ends, the information associated with the conference call may be removed from conference call data 52.

Conference call data 52 may include other suitable information. For example, conference call data 52 may include a passcode that must be entered into an endpoint 20 in order to access the conference call. As another example, conference call data 52 may include a recording of a message entered by a user of endpoint 20 that may be used to identify the user. For example, a user may record his or her name prior to entering the conference call. Conference call data 52 may also include any policy or state specific to a caller identifier such as owner or moderator privileges.

According to one embodiment, modules 44 may include, for example, a voice response unit 60, an authentication module 62, and an audio mixer 64 coupled as shown in FIG. 2. Voice response unit 60 receives input from endpoint 20 and outputs responses to endpoint 20. The responses may comprise voice responses, for example, recorded or computer-generated voice responses. According to the illustrated embodiment, voice response unit 60 includes a detector 70, one or more workflows 72, and a message generator 74 coupled as illustrated in FIG. 2. Detector 70 detects input into voice response unit 60 from endpoint 20. Workflows 72 describe the operation of voice response unit 60 in response to input from endpoint 20. Message generator 74 generates messages that voice response unit 60 presents to endpoint 20. Message generator 74 may include a voice synthesizer or a player that plays pre-recorded messages.

Authentication module 62 may be used to verify that endpoint 20 is authorized to access a conference call before allowing the endpoint 20 access to the conference call. For example, a user of endpoint 20 may be asked to enter a passcode before being granted access to a conference call. A passcode may refer to a code that is used to verify the identity of a user. Authentication module 62 may also verify a user of endpoint 20 through a biometric attribute such as a voice print, a facial feature map, or a hand geometry map of the user. Audio mixer 64 mixes signals received from endpoints. The mixed signals are transmitted to endpoints 20 such that each endpoint 20 may play the signals sent by the other endpoints 20.

Control logic 40, memory 42, and modules 44 may be integrated or separated according to particular needs. For example, the present invention contemplates the functions of control logic 40, memory 42, and one or more modules 44 being provided at a single device. Control logic 40, memory 42, and one or more modules 44 may, however, be separated. For example, authentication module 62 may be located at a separate device. Any of control logic 40, memory 42, and one or more modules may be coupled to any other using a bus, a local area network (LAN), a metropolitan area network (MAN), a wide area network (WAN), a global computer network such as the Internet, or any other appropriate wire line, wireless, or other links.

Modifications, additions, or omissions may be made to conference server 22 without departing from the scope of the invention. For example, conference server 22 may have more, fewer, or other modules. Moreover, the operations of conference server 22 may be performed by more, fewer, or other modules. For example, the operations of voice response unit 60 and authentication module 62 may be performed by one module, or the operations of voice response unit 60 may be performed by more than one module. Additionally, functions may be performed using any suitable logic comprising software, hardware, other logic, or any suitable combination of the preceding.

Conference server 22 may provide advantages over other methods of connecting a conference call. For example, the session initiation protocol (SIP) assigns a unique universal resource identifier (URI) to each conference call. However, this unique URI is typically not the same address which was used to initially contact the conference service. An endpoint 20 sends a request to this URI to participate in the conference call. This URI, however, is not used to connect or reconnect endpoint 20 to the conference call. Conference server 22 may provide an advantage in that it correlates a conference call identifier with a caller identifier and restores the state of an endpoint if endpoint 20 is disconnected.

FIG. 3 is a flowchart demonstrating one embodiment of a method for connecting an endpoint to a conference call. The method may describe a workflow 50 according to which control logic 40 operates. The method begins at step 100, where conference server 22 receives conference call information for a conference call. The conference call information may include, for example, a conference call identifier of the conference call, and caller identifiers of one or more endpoints 20 allowed to participate in the conference call. The conference call information may also include, for example, a password or other information associated with an endpoint 20.

The conference call information may be provided in any suitable manner. For example, an organizing endpoint 20 may provide the conference call information. As another example, an endpoint 20 requesting access to a conference call may provide the conference call information. The information may be used to connect or reconnect the endpoint 20 to the conference call. Conference server 22 maps the caller identifier to the conference call identifier at step 104 to associate endpoint 20 with the conference call. The mapping may be stored as conference call data 52 while the conference call is in session.

A call is received from endpoint 20 at step 110. Conference server 22 determines if endpoint 22 is associated with a conference call that is in session at step 112. The conference call data 52 may indicate that the caller identifier is mapped to a conference call identifier for a conference call that is in session. If the endpoint is not associated with an in session conference call at step 114, the method proceeds to step 116. At step 116, endpoint 20 is denied access into the conference call, and the call from endpoint 20 is processed as a new call. After processing the new call, the method terminates. If the endpoint is associated with an in session conference call at step 114, the method proceeds to step 118, where conference server 22 initiates connection to the conference call.

According to one embodiment, there may be a connect request option at step 120. The connect request option provides for asking the user of endpoint 20 whether the user would like endpoint 2Q to connect to the conference call. If there is a connect request option at step 120, the method proceeds to step 126 to determine if the user of endpoint 20 wants to connect. The user may select to connect by sending a request to connect. If the user of endpoint 20 does not want to connect at step 128, the method proceeds to step 116. If the user of endpoint 20 wants to connect at step 128, the method proceeds to step 130. If there is no connect request option at step 120, the method proceeds directly to step 130.

According to one embodiment, an authentication option may be provided at step 130. An authentication option allows for authentication of endpoint 20 before connecting endpoint 20 to the conference call. If there is an authentication option at step 130, the method proceeds to step 136, where conference server initiates the authentication process. Authentication module 62 authenticates endpoint 20 at step 138. If endpoint 20 is not authenticated, the method proceeds to step 116. If endpoint 20 is authenticated, the method proceeds to step 140. If there is no authentication option at step 130, the method proceeds directly to step 140.

According to one embodiment, an announcement option may be provided at step 140. An announcement option provides for announcing the user of endpoint 20 by playing a recording or other audio signal associated with the user. If there is an announcement option, the method proceeds to step 142, where voice response unit 60 announces the caller. If there is no announcement option, the method proceeds directly to step 144. At step 144, endpoint 20 is granted access to the conference call and is connected to the conference call. After connecting endpoint 20, the method terminates.

Modifications, additions, or omissions may be made to the method without departing from the scope of the invention. Additionally, steps may be performed in any suitable order without departing from the scope of the invention.

Certain embodiments of the invention may provide one or more technical advantages. A technical advantage of one embodiment may be that a caller identifier associated with an endpoint may be efficiently associated with a conference call in which the endpoint was participating. Accordingly, the endpoint may be readily connected or reconnected to the conference call.

Another technical advantage of one embodiment may be that the endpoint is not required to send conference identifier information in order to connect to the call. Yet another technical advantage of one embodiment may be that the endpoint may be required to send authentication information before being connected to the conference call. And yet another technical advantage of one embodiment may be that the user of the endpoint may be given a choice to connect to the conference call.

Although an embodiment of the invention and its advantages are described in detail, a person skilled in the art could make various alterations, additions, and omissions without departing from the spirit and scope of the present invention as defined by the appended claims.

What is claimed is:

1. A method for connecting an endpoint to a conference call, comprising:
   associating a caller identifier with a conference call identifier by mapping the caller identifier to the conference call identifier, the caller identifier corresponding to an endpoint, the conference call identifier corresponding to a conference call;
   receiving a call from the endpoint associated with the caller identifier;
   determining from the mapping and independent of any conference identifier information sent by the endpoint that the caller identifier is associated with the conference call identifier of the conference call;
   initiating connection of the endpoint to the conference call in order to connect the endpoint to the conference call;
   after a disconnection with the endpoint, receiving another call from the endpoint;
   determining from the mapping and independent of any conference identifier information sent by the endpoint that the caller identifier is associated with the conference call identifier of the conference call; and
   initiating connection of the endpoint to the conference call in order to reconnect the endpoint to the conference call.

2. The method of claim 1, wherein associating the caller identifier with the conference call identifier further comprises:
   receiving an initial call from the endpoint;
   associating the caller identifier with the conference call identifier in response to receiving the initial call; and
   providing the endpoint an initial connection to the conference call.

3. The method of claim 1, wherein associating the caller identifier with the conference call identifier further comprises:
   receiving conference call information comprising the caller identifier and the conference call identifier; and
   associating the caller identifier with the conference call identifier.

4. The method of claim 1, wherein associating the caller identifier with the conference call identifier further comprises storing the conference call identifier associated with the caller identifier in a conference call table.

5. The method of claim 1, wherein initiating connection of the endpoint to the conference call in order to connect the endpoint to the conference call further comprises:
   determining whether the conference call is in session; and
   initiating connection of the endpoint to the conference call if the conference call is in session.

6. The method of claim 1, wherein initiating connection of the endpoint to the conference call in order to connect the endpoint to the conference call further comprises:
   determining if there is a request for connection, the request associated with the endpoint; and
   connecting the endpoint with the conference call if there is the request for connection.

7. The method of claim 1, wherein initiating connection of the endpoint to the conference call in order to connect the endpoint to the conference call further comprises:
   determining if the endpoint is authorized to connect with the conference call; and
   connecting the endpoint with the conference call if the endpoint is authorized to connect with the conference call.

8. The method of claim 1, wherein initiating connection of the endpoint to the conference call in order to connect the endpoint to the conference call further comprises announcing a caller associated with the caller identifier prior to connecting the endpoint with the conference call.

9. A system for connecting an endpoint to a conference call, comprising:
   a memory operable to store data; and
   control logic coupled to the memory and operable to:
      associate a caller identifier with a conference call identifier by mapping the caller identifier to the conference call identifier, the caller identifier corresponding to an endpoint, the conference call identifier corresponding to a conference call;
      receive a call from the endpoint associated with the caller identifier;
      determine from the mapping and independent of any conference identifier information sent by the endpoint that the caller identifier is associated with the conference call identifier of the conference call;
      initiate connection of the endpoint to the conference call in order to connect the endpoint to the conference call;
      after a disconnection with the endpoint, receive another call from the endpoint;
      determine from the mapping and independent of any conference identifier information sent by the endpoint that the caller identifier is associated with the conference call identifier of the conference call; and
      initiate connection of the endpoint to the conference call in order to reconnect the endpoint to the conference call.

10. The system of claim 9, the control logic operable to associate the caller identifier with the conference call identifier by:
    receiving an initial call from the endpoint;
    associating the caller identifier with the conference call identifier in response to receiving the initial call; and
    providing the endpoint an initial connection to the conference call.

11. The system of claim 9, the control logic operable to associate the caller identifier with the conference call identifier by:
    receiving conference call information comprising the caller identifier and the conference call identifier; and
    associating the caller identifier with the conference call identifier.

12. The system of claim 9, the control logic operable to associate the caller identifier with the conference call identifier by storing the conference call identifier associated with the caller identifier in a conference call table.

13. The system of claim 9, the control logic operable to initiate connection of the endpoint to the conference call in order to connect the endpoint to the conference call by:
    determining whether the conference call is in session; and
    initiating connection of the endpoint to the conference call if the conference call is in session.

14. The system of claim 9, the control logic operable to initiate connection of the endpoint to the conference call in order to connect the endpoint to the conference call by:
    determining if there is a request for connection, the request associated with the endpoint; and
    connecting the endpoint with the conference call if there is the request for connection.

15. The system of claim 9, the control logic operable to initiate connection of the endpoint to the conference call in order to connect the endpoint to the conference call by:
   determining if the endpoint is authorized to connect with the conference call; and
   connecting the endpoint with the conference call if the endpoint is authorized to connect with the conference call.

16. The system of claim 9, the control logic operable to initiate connection of the endpoint to the conference call in order to connect the endpoint to the conference call by announcing a caller associated with the caller identifier prior to connecting the endpoint with the conference call.

17. A tangible, physical computer-readable medium encoded with logic for connecting an endpoint to a conference call, the logic operable to:
   associate a caller identifier with a conference call identifier by mapping the caller identifier to the conference call identifier, the caller identifier corresponding to an endpoint, the conference call identifier corresponding to a conference call;
   receive a call from the endpoint associated with the caller identifier;
   determine from the mapping and independent of any conference identifier information sent by the endpoint that the caller identifier is associated with the conference call identifier of the conference call;
   initiate connection of the endpoint to the conference call in order to connect the endpoint to the conference call;
   after a disconnection with the endpoint, receive another call from the endpoint;
   determine from the mapping and independent of any conference identifier information sent by the endpoint that the caller identifier is associated with the conference call identifier of the conference call; and
   initiate connection of the endpoint to the conference call in order to reconnect the endpoint to the conference call.

18. The tangible, physical computer-readable medium encoded with the logic of claim 17, the logic operable to associate the caller identifier with the conference call identifier by:
   receiving an initial call from the endpoint;
   associating the caller identifier with the conference call identifier in response to receiving the initial call; and
   providing the endpoint an initial connection to the conference call.

19. The tangible, physical computer-readable medium encoded with the logic of claim 17, the logic operable to associate the caller identifier with the conference call identifier by:
   receiving conference call information comprising the caller identifier and the conference call identifier; and
   associating the caller identifier with the conference call identifier.

20. The tangible, physical computer-readable medium encoded with the logic of claim 17, the logic operable to associate the caller identifier with the conference call identifier by storing the conference call identifier associated with the caller identifier in a conference call table.

21. The tangible, physical computer-readable medium encoded with the logic of claim 17, the logic operable to initiate connection of the endpoint to the conference call in order to connect the endpoint to the conference call by:
   determining whether the conference call is in session; and
   initiating connection of the endpoint to the conference call if the conference call is in session.

22. The tangible, physical computer-readable medium encoded with the logic of claim 17, the logic operable to initiate connection of the endpoint to the conference call in order to connect the endpoint to the conference call by:
   determining if there is a request for connection, the request associated with the endpoint; and
   connecting the endpoint with the conference call if there is the request for connection.

23. The tangible, physical computer-readable medium encoded with the logic of claim 17, the logic operable to initiate connection of the endpoint to the conference call in order to connect the endpoint to the conference call by:
   determining if the endpoint is authorized to connect with the conference call; and
   connecting the endpoint with the conference call if the endpoint is authorized to connect with the conference call.

24. The tangible, physical computer-readable medium encoded with the logic of claim 17, the logic operable to initiate connection of the endpoint to the conference call in order to connect the endpoint to the conference call by announcing a caller associated with the caller identifier prior to connecting the endpoint with the conference call.

25. A system for connecting an endpoint to a conference call, comprising:
   means for associating a caller identifier with a conference call identifier by mapping the caller identifier to the conference call, the caller identifier corresponding to an endpoint, the conference call identifier corresponding to a conference call;
   means for receiving a call from the endpoint associated with the caller identifier;
   means for determining from the mapping and independent of any conference identifier information sent by the endpoint that the caller identifier is associated with the conference call identifier of the conference call;
   means for initiating connection of the endpoint to the conference call in order to connect the endpoint to the conference call;
   means for, after a disconnection with the endpoint receiving another call from the endpoint;
   means for determining from the mapping and independent of any conference identifier information sent by the endpoint that the caller identifier is associated with the conference call identifier of the conference call; and
   means for initiating connection of the endpoint to the conference call in order to reconnect the endpoint to the conference call.

26. A method for connecting an endpoint to a conference call, comprising:
   receiving an initial call from an endpoint having a caller identifier;
   connecting the endpoint to a conference call having a conference call identifier;
   associating the caller identifier with the conference call identifier by mapping the caller identifier to the conference call identifier and by storing the conference call identifier associated with the caller identifier in a conference call table;
   receiving a next call from the endpoint associated with the caller identifier;
   determining from the mapping and independent of any conference identifier information sent by the endpoint that the caller identifier is associated with the conference call identifier of the conference call; and initiating connection of the endpoint to the conference call in order to connect the endpoint to the conference call by:

determining whether the conference call is in session;

initiating connection of the endpoint to the conference call if the conference call is in session;

determining if there is a request for connection, the request associated with the endpoint;

initiating connection the endpoint with the conference call if there is the request for connection;

determining if the endpoint is authorized to connect with the conference call;

connecting the endpoint with the conference call if the endpoint is authorized to connect with the conference call;

announcing a caller associated with the caller identifier prior to connecting the endpoint with the conference call;

after a disconnection with the endpoint, receiving another call from the endpoint;

determining from the mapping and independent of any conference identifier information sent by the endpoint that the caller identifier is associated with the conference call identifier of the conference call; and initiating connection of the endpoint to the conference call in order to reconnect the endpoint to the conference call.

* * * * *